(12) United States Patent
Randolph

(10) Patent No.: US 9,713,225 B2
(45) Date of Patent: Jul. 18, 2017

(54) OVERHEATING SAFETY DEVICE AND LUMINAIRE

(71) Applicant: Cree, Inc., Durham, NC (US)

(72) Inventor: David Randolph, Wake Forest, NC (US)

(73) Assignee: Cree, Inc., Durham, NC (US)

(*) Notice: Subject to any disclaimer, the term of this patent is extended or adjusted under 35 U.S.C. 154(b) by 0 days.

(21) Appl. No.: 14/449,531

(22) Filed: Aug. 1, 2014

(65) Prior Publication Data

US 2016/0037597 A1  Feb. 4, 2016

(51) Int. Cl.

| | |
|---|---|
| *H05B 37/02* | (2006.01) |
| *H05B 33/08* | (2006.01) |
| *F21V 23/04* | (2006.01) |
| *F21V 5/04* | (2006.01) |
| *F21V 7/00* | (2006.01) |
| *F21V 23/00* | (2015.01) |
| *F21S 8/02* | (2006.01) |
| *F21V 13/04* | (2006.01) |
| *F21Y 115/10* | (2016.01) |

(52) U.S. Cl.
CPC ........ *H05B 33/089* (2013.01); *F21V 23/04* (2013.01); *F21V 23/0471* (2013.01); *H05B 33/0842* (2013.01); *H05B 37/0227* (2013.01); *F21S 8/02* (2013.01); *F21V 5/04* (2013.01); *F21V 7/0066* (2013.01); *F21V 13/04* (2013.01); *F21V 23/003* (2013.01); *F21Y 2115/10* (2016.08)

(58) Field of Classification Search
USPC .... 315/209 R, 119, 120, 125, 127, 129, 136, 315/225, 291, 297, 306, 307, 308, 310, 315/362
See application file for complete search history.

(56) References Cited

U.S. PATENT DOCUMENTS

2014/0103818 A1* 4/2014 Chen .................... H03K 17/133
                                                            315/159
2014/0195842 A1* 7/2014 Sreedharan Nair ... G06F 1/3293
                                                            713/323

* cited by examiner

*Primary Examiner* — Douglas W Owens
*Assistant Examiner* — Jianzi Chen
(74) *Attorney, Agent, or Firm* — Dennis J. Williamson; Moore & Van Allen PLLC

(57) ABSTRACT

A luminaire includes a light source and an electrical path for providing power to the light source. A switch is in the electrical path and is operable to interrupt and complete the electrical path. An infrared sensor detects an object in proximity to the light source for controlling operation of the switch.

15 Claims, 2 Drawing Sheets

OVERHEATING SAFETY DEVICE AND LUMINAIRE

BACKGROUND

Some luminaires, such as light fixtures, lamps, lights or the like, require an insulation sensor that is intended to prevent the luminaire from overheating to avoid the risk of fire. One such environment where insulation sensors are used is in luminaires such as in recessed lighting applications where the luminaire may be mounted in a ceiling or other structure and covered by insulation or other construction material that is hidden from view. In such a situation the luminaire may overheat causing a fire hazard. Such luminaires may be referred to as non-insulation covered (NON-IC) luminaires. Typically the sensor comprises a self-heating insulation sensor (SHIS). One SHIS comprises a bimetallic switch and a heater element. The heating element is powered by the electricity that powers the luminaire. The heating element produces a predetermined amount of heat that in normal operating conditions is dissipated to the surrounding ambient environment and has no effect on the bimetallic switch. If the lamp and the SHIS are covered, such as by insulation, such that the heat cannot be dissipated to the ambient environment, the bimetallic switch overheats and opens causing the power to the luminaire to be interrupted such that the light source is turned off and overheating of the luminaire and surrounding material is prevented. When the power to the heating element is cut off, the heating element and bimetallic switch are allowed to cool. After a period of time the bimetallic switch cools enough to close thereby allowing power to be delivered to the SHIS and to the luminaire. If the overheating condition of the luminaire is not corrected the luminaire will continue to cycle on and off as the bimetallic switch heats and opens and subsequently cools and closes. The cycling on and off of the luminaire produces a visual indication that a potential overheating condition exists. Once the overheating condition is remedied the bimetallic switch remains closed.

SUMMARY

In some embodiments a luminaire comprises a light source and an electrical path for providing power to the light source. A switch is in the electrical path and is operable to interrupt and complete the electrical path. An infrared sensor detects an object in proximity to the light source for controlling operation of the switch.

The light source may comprise at least one LED. The light source may be removably connected to the luminaire. The switch and the sensor may be mounted on the luminaire. A frame may support the luminaire in a structure and a junction box may be mounted on the frame where the switch may be mounted in the junction box. The infrared sensor may comprise an infrared light source. The infrared light source may comprise at least one LED. The infrared light source may emit modulated light. The infrared sensor may comprise a receiver. The infrared sensor may transmit an output signal that opens the switch to interrupt the electrical path. A controller may control the switch. The controller may comprise a processor and a software program. The controller may close the switch after a first predetermined period of time. The controller may open the switch after a second predetermined period of time to cycle the luminaire between on and off states for as long as the sensor generates the output signal. A housing may be provided for the light source. The housing may comprise at least one of a reflector and a lens.

In some embodiments a method of operating a luminaire comprises providing a light source and an electrical path for providing power to the light source; detecting an object in proximity to the light source by an infrared sensor; interrupting the electrical path in response to the detecting of an object. The method may comprise completing the electrical path after a first predetermined period of time. The method may comprise that after a second predetermined period of time, the electrical path is interrupted if the sensor detects an object in proximity to the light source. The second predetermined period of time may be selected to prevent overheating of the light source.

DETAILED DESCRIPTION

Figure 1:
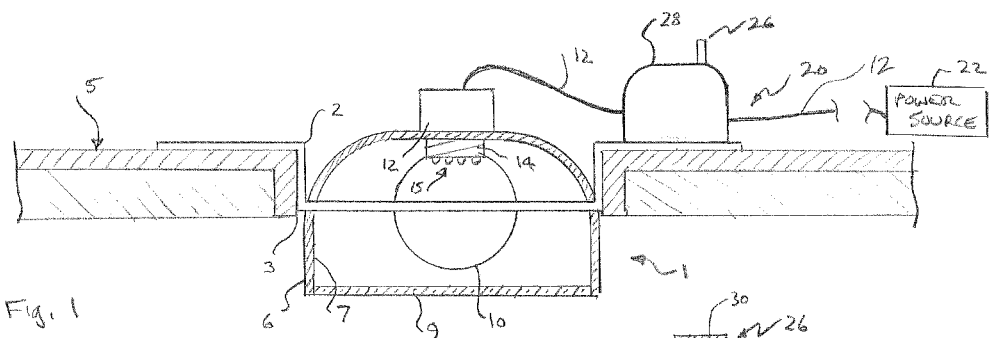
FIG. 1 is a partial section view showing an embodiment of a luminaire and the safety mechanism of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Moreover, the various aspects of the embodiments as described herein may be used in combination with any other aspects of the embodiments as described herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

Figure 2:
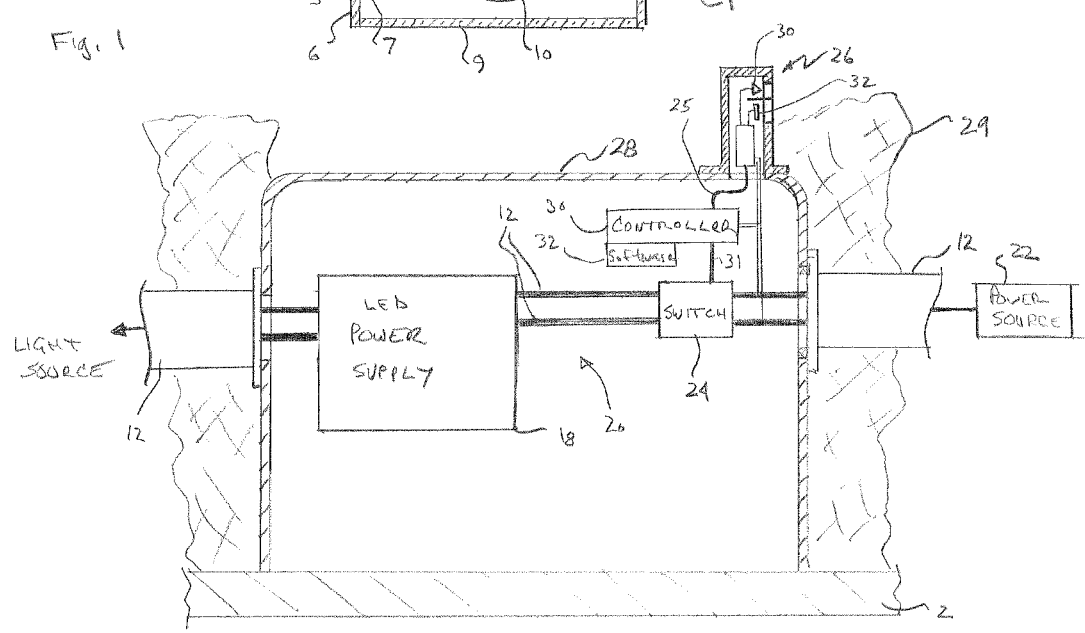
FIG. 2 is a detailed partial section view of the luminaire and safety mechanism of FIG. 1.

Referring to FIGS. 1 and 2 in one embodiment a luminaire 1 is shown comprising a frame or support 2 for supporting the luminaire 1. The luminaire 1 may be mounted in a hole 3 formed in a ceiling 5 or other structure where the back side of the luminaire and its environment are hidden from view. The luminaire 1 may also comprise a housing 6 that may comprise a reflector 7 and/or lens 9 or other optics for projecting light from the luminaire 1 in a desired pattern. A light source 10 is mounted to or in the housing and is electrically coupled to a power source 22. In the illustrated embodiment the light source 10 is an LED lamp comprising at least one, and, typically, a plurality of LEDs 15; however, the light source 10 may comprise an incandescent bulb, CFL bulb, halogen lamp or other light source. The light source 10 may be removably electrically coupled to the luminaire via an Edison socket 12 and mating Edison screw 14, or other standard or non-standard electrical coupling, such that the light source 10 may be removed from the luminaire and replaced. In some embodiments the entire luminaire may be installed as a complete structure such that the light source 10 may be a permanent part of the luminaire. For an LED lamp the power supply 18 for the LEDs may be part of the luminaire 1 remote from the light source 10 or it may be part of the LED light source 10.

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 1500K to about 7500K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

The LED light source 10, according to some embodiments of the present invention, is embodied in a form factor of a traditional incandescent bulb. In an omnidirectional lamp the light is emitted in a wide omnidirectional pattern. In one embodiment, the LED light source 10 may be a replacement for an ANSI standard A series bulb such that the dimensions of the LED light source 10 fall within the ANSI standards for an A series bulb. In other embodiments the LED light source 10 may be dimensioned to be a replacement for a standard PAR incandescent bulb, such as a PAR-20, 30 or 38 bulb, or a BR-style lamp, such as a BR30. Standard BR type bulbs are reflector bulbs where an internal reflective surface of the enclosure reflects light such that the light beam is emitted in a directional pattern; however, the beam angle is not tightly controlled and may be up to about 90-100 degrees or other fairly wide angles. Standard PAR bulbs are reflector bulbs that reflect light in a direction where the reflective surface is a parabola and the beam angle is tightly controlled. PAR lamps may direct the light in a pattern having a tightly controlled beam angle such as, but not limited to, 10°, 25° and 40°.

The luminaire and the light source may be embodied in different forms including standard and non-standard form factors. In other embodiments, the luminaire and the LED light source can have any shape, including standard and non-standard shapes. In some embodiments, the luminaire and LED light source may be equivalent to standard Watt incandescent light bulbs such as, but not limited to, 100 Watt, 150 Watt or other Wattages.

An electrical path 20 delivers critical current to the luminaire 1 to power the light source 10. The electrical path 20 may comprise wires or other conductors 12 that deliver current from a power source 22, such as the electrical grid of a building, to the luminaire 1. The safety device of the invention is located in the electrical path 20 and operates to control the opening and closing of a switch 24 to interrupt and complete the electrical path 20 from the power source 22 to the luminaire 1. As used herein when the switch 24 is open the electrical path between the power source 22 and the switch 24 is interrupted and when the switch 24 is closed the electrical path between the power source 22 and the switch 24 is completed. The safety device comprises a sensor 26 that controls the opening and closing of the switch 24.

The switch 24 and sensor 26 may be mounted in or to a junction box 28 that is mounted on the frame 2 or other support structure of the luminaire 1. In some embodiments the sensor 24 and switch 26 may be mounted separate from the luminaire 1; however, providing the sensor and switch as part of the luminaire may simplify installation. The sensor 26 is mounted such that the sensing elements of the sensor 26 are disposed at a desired height relative to the lamp and/or structure in which the luminaire is mounted. For example, some building codes require that the sensor be located in a predetermined position relative to the building structure to detect improperly installed building materials such as insulation 29. For example, in ceiling light installations UL requirements mandate that the sensor be positioned four inches above the top of the ceiling structure in order to detect improperly installed insulation. In some embodiments, more than one sensor 26 may be employed with a luminaire where the sensors are positioned in different locations relative to the luminaire although a typical installation comprises one sensor for each luminaire.

The sensor 26 comprises an infrared (IR) sensor that operates to detect if an object or structure, such as insulation 29, is improperly positioned relative to the luminaire 1 such that the insulation or other structure may cause an overheating condition and present a fire hazard. The term "object" as used herein means insulation, other building materials or any structure material, or substance that may cause an overheating condition for the luminaire. The infrared sensor 26 comprises an infrared light source 30, such as an LED, that emits a beam of infrared light. The receiver 32 such as a photodetector detects any reflection of the light emitted from the infrared light source 30 by an object such as insulation 29 that is in close proximity to the sensor 26. In some embodiments the emitted light may be modulated such that the light is at a specific frequency and the receiver 32 may only respond to that frequency. If reflected light is detected by receiver 32, the sensor 26 produces and transmits an output signal over signal path 25 that opens the switch 24 and interrupts the flow of current to the luminaire 1 through electrical path 20 to prevent overheating of the luminaire. A signal path as used herein may comprise any medium suitable for transmitting a control signal between system components and may comprise a cable, wires, Ethernet, wireless transmission such as radio, WiFi, WLAN or the like. The switch 24 may comprise a solid state or electromechanical switch.

In some embodiments the switch 24 may be controlled by a controller 30 such as a processor and control logic unit that may comprise a microprocessor, a CPU, programmable controller, PLC or other similar controller 30. The controller 30 may include data structures or software programs 32 including computer-executable or computer-readable instructions to control operation of the switch 24 and its components. In response to a signal received from sensor 26, the controller 30 transmits a signal over signal path 31 that is received by the switch 24 that opens the switch to interrupt flow of current to the luminaire to prevent overheating of the light source 10. The sensor, switch and controller may be powered by power from power source 22. In some embodiments the sensor 26 may be tuned to prevent false positive readings. For example a timer may be used that requires that the reflected light, from a potential object, be detected for a predetermined period of time before power to the luminaire is interrupted to prevent transitory obstructions, such as animals, from actuating the switch. In other embodiments multiple emitter/receiver pairs may be used and located to prevent power to the luminaire from being interrupted upon the detection of small items. For example the emitter/receiver pairs may be located such that objects of at least a minimum size must be detected before the switch 24 is opened and power to the luminaire is interrupted.

The controller 30 may be programmed such that after a first predetermined period of time a second signal is sent to the switch 24 to close the switch 24 to allow current to flow to the light source 10. Assuming that the sensor 26 continues to detect insulation or other obstruction, the program logic of the controller 30 may open the switch 24 after a second predetermined period of time. The opening and closing of the switch may be repeated to cycle the luminaire between on and off states for as long as the sensor 26 detects an obstruction. The length of the second predetermined period of time is selected such that the luminaire 1 is in an "on" state for a short enough time that the luminaire does not overheat or cause a fire hazard. In this manner the system of the invention mimics the cycling of the traditional bimetal switch to produce a visual alert indicating an incorrect insulation installation situation. In some embodiments, the timing of the on/off cycle may be selected to correspond to the on/off cycle commonly found on a bimetal switch. In one example embodiment, the switch may close and open approximately every 20 minutes, although any suitably timed cycle may be used.

While the safety device as described herein has application in any luminaire or lighting system, the sensor has particular suitability for use with an LED luminaire. The traditional bimetal SHIS sensor consumes approximately 2 Watts of power. A typical incandescent light consumes significantly more power than 2 Watts. For example, an incandescent bulb may use between 40 and 500 Watts of power. Bulbs that present fire hazards typically operate at over 100 Watts. Thus, a SHIS sensor uses a relatively small amount of power when compared to the total power consumed by the incandescent bulb with which it is used. Conversely, LED based lamps use approximately 10-15% of the power as traditional incandescent bulbs for the same output. For example an LED lamp that produces a similar lumen output as a 100 watt incandescent light bulb may consume on the order of 9-10 watts. If a traditional SHIS sensor that uses 2 watts for its operation is used, approximately 20% of the total power consumed by the luminaire goes to operate the sensor. By comparison the IR sensor as described herein uses approximately 0.10 watts such that approximately 1% of the total power consumed by the LED based luminaire goes to operate the sensor. As a result, the energy efficiency of an LED luminaire is largely preserved using the IR sensor as described herein.

Figure 3:
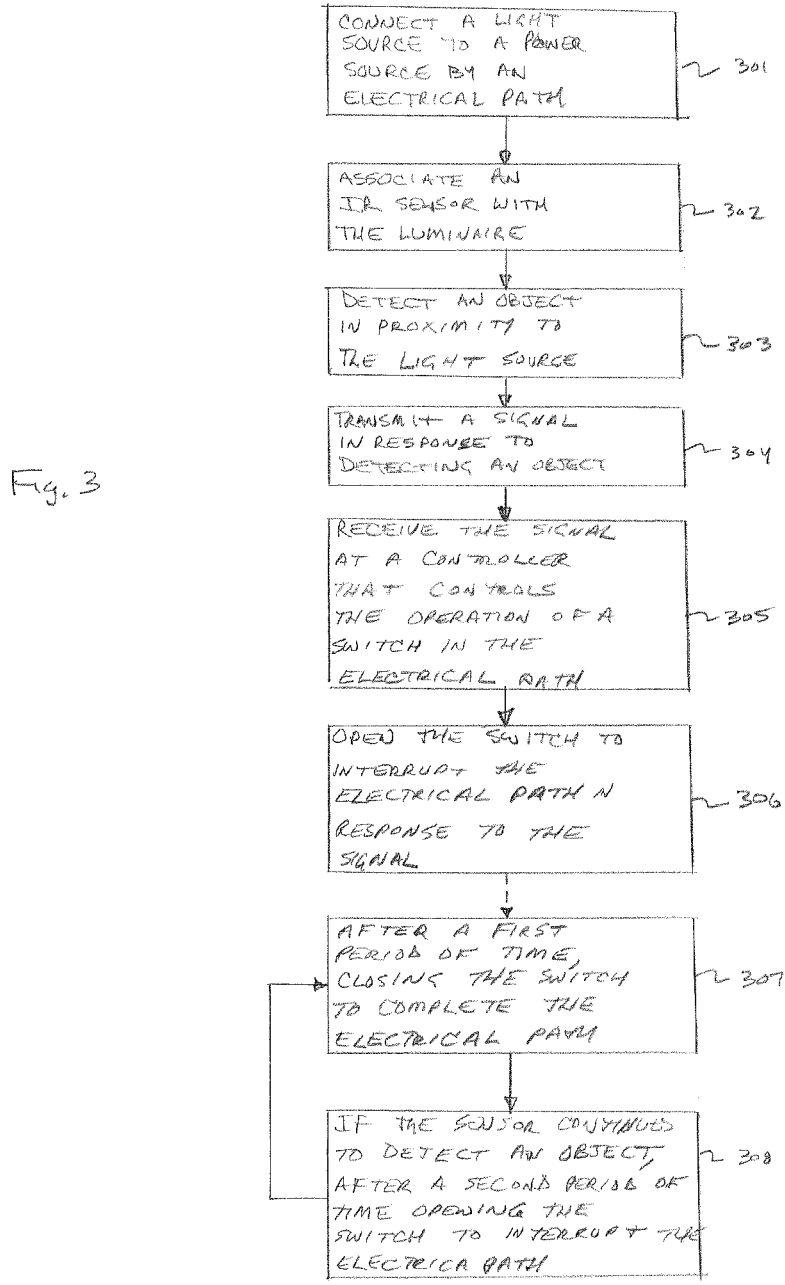
FIG. 3 is a block diagram illustrating a method of operating a luminaire and safety mechanism.

An embodiment of a method of operating the luminaire is shown in FIG. 3 where a light source is connected to a power source by an electrical path as described herein (block 301). An infrared sensor is associated with the luminaire (block 302). The IR sensor detects an object in proximity to the light source (block 303). Upon detection of an object in proximity to the light source, the sensor transmits a signal that interrupts the electrical path and turns off the light source (block 304). The signal may be received by a controller that controls operation of a switch in the electrical path to open and close the switch to interrupt and complete the electrical path (block 305). Upon receipt of the signal from the sensor the controller opens the switch to interrupt the electrical path (block 306). Once the electrical path is interrupted the light source may remain "off" until the object is removed from proximate sensor. Optionally, after the switch is opened the controller may control the switch to close the switch and complete the electrical path after a first predetermined period of time to turn on the light source (block 307). After a second predetermined period of time, the controller may open the switch to interrupt the electrical path and turn off the light source if the sensor continues to detect an object in proximity to the light source (block 308). The cycling of the opening and closing of the switch may be repeated for as long as the sensor detects an object in proximity to the light source. The second predetermined period of time is selected to prevent overheating of the light source such that the light source is turned off before the light source presents an overheating risk.

While the sensor of the invention is described herein with specific reference to a luminaire and more particularly to an LED luminaire, the sensor may be used in any application where the detection of obstructions such as insulation may be desired. Such applications may include, but are not limited to, electric motors, furnace installations or the like.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A luminaire comprising:
   a light source;
   an electrical path for providing power to the light source;
   a switch in the electrical path operable to interrupt and complete the electrical path; and
   an infrared sensor for detecting an object in proximity to the light source for controlling operation of the switch wherein the sensor transmits a signal to a controller upon detection of the object and the controller controls the switch to open the switch upon the detection of the object;
   the controller automatically closes the switch after a first predetermined period of time; and the sensor transmits the signal to the controller upon continued detection of the object and the controller automatically opens the switch after a second predetermined period of time; whereby the luminaire is cycled between on and off states upon the continued detection of the object.

2. The luminaire of claim 1 wherein the light source comprises at least one LED.

3. The luminaire of claim 2 wherein the sensor uses approximately 1% of the power used by the light source.

4. The luminaire of claim 1 wherein the light source is removably connected to the luminaire.

5. The luminaire of claim 1 wherein the switch and the sensor are mounted on the luminaire.

6. The luminaire of claim 5 further comprising a frame for supporting the luminaire in a structure and a junction box mounted on the frame, the switch being mounted in the junction box.

7. The luminaire of claim 1 wherein the infrared sensor comprises an infrared light source.

8. The luminaire of claim 7 wherein the infrared light source comprises at least one LED.

9. The luminaire of claim 7 wherein the infrared light source emits modulated light.

10. The luminaire of claim 1 wherein the infrared sensor comprises a receiver.

11. The luminaire of claim 1 wherein the infrared sensor transmits a signal that opens the switch to interrupt the electrical path.

12. The luminaire of claim 1 wherein the controller comprises a processor and a software program.

13. The luminaire of claim 1 further comprising a housing for the light source.

14. The luminaire of claim 13 wherein the housing comprises at least one of a reflector and a lens.

15. A method of operating a luminaire comprising:
   providing a LED light source and an electrical path for providing power to the light source;
   detecting an object in proximity to the light source by an infrared sensor;
   interrupting the electrical path in response to the detecting of an object in proximity to the light source by the sensor to stop the flow of current to the LED light source and turn the LED light source off;
   automatically completing the electrical path after a first predetermined period of time to allow the flow of current to the LED light source and turn the LED light source on;
   after a second predetermined period of time, automatically interrupting the electrical path to stop the flow of current to the LED light source and turn the LED light source off if the sensor detects an object in proximity to the light source where the second predetermined period of time is selected such that the luminaire does not overheat.

* * * * *